United States Patent
Kawai

(10) Patent No.: US 7,768,677 B2
(45) Date of Patent: Aug. 3, 2010

(54) IMAGE PICKUP APPARATUS FOR ACCURATELY CORRECTING DATA OF SUB-IMAGES PRODUCED BY A SOLID-STATE IMAGE SENSOR INTO A COMPLETE IMAGE

(75) Inventor: Tomoyuki Kawai, Asaka (JP)

(73) Assignee: Fujifilm Corporation, Tokyo (JP)

( * ) Notice: Subject to any disclaimer, the term of this patent is extended or adjusted under 35 U.S.C. 154(b) by 827 days.

(21) Appl. No.: 11/711,664

(22) Filed: Feb. 28, 2007

(65) Prior Publication Data

US 2007/0206238 A1    Sep. 6, 2007

(30) Foreign Application Priority Data

Mar. 3, 2006    (JP)    ............................. 2006-058015

(51) Int. Cl.
*H04N 1/04*    (2006.01)
(52) U.S. Cl. ........................ 358/482; 358/483; 358/474; 358/513
(58) Field of Classification Search ................. 358/482, 358/483, 474, 513, 514, 505; 250/208.1
See application file for complete search history.

(56) References Cited

U.S. PATENT DOCUMENTS 7,355,760 B2 * 4/2008 Yoshihara et al. ........... 358/474

FOREIGN PATENT DOCUMENTS

| JP | 2002-125149 A | 4/2002 |
|---|---|---|
| JP | 2003-298950 A | 10/2003 |
| JP | 2003-304454 A | 10/2003 |
| JP | 2004-336244 A | 11/2004 |

\* cited by examiner

*Primary Examiner*—Houshang Safaipour
(74) *Attorney, Agent, or Firm*—Birch, Stewart, Kolasch & Birch, LLP

(57) ABSTRACT

A solid-state image sensor produces an image including plural sub-images, which are rapidly read out and outputted via output circuits. The image sensor has its imaging surface divided into corresponding plural sub-areas producing image data, which is transferred by the horizontal transfer path in both left and right directions and outputted from the output circuits, whose amplifier characteristics are determined as follows. Optical black (OB) data from an OB area on the imaging surface is transferred in the left direction by the horizontal transfer path and outputted from one output circuit as total OB data. OB data is transferred by the horizontal transfer path in both left and right direction and outputted from the output circuits as left and right OB data. An output circuit characteristics determiner uses the total, and left and right OB data to determine the amplifier characteristics of the output circuits.

28 Claims, 16 Drawing Sheets

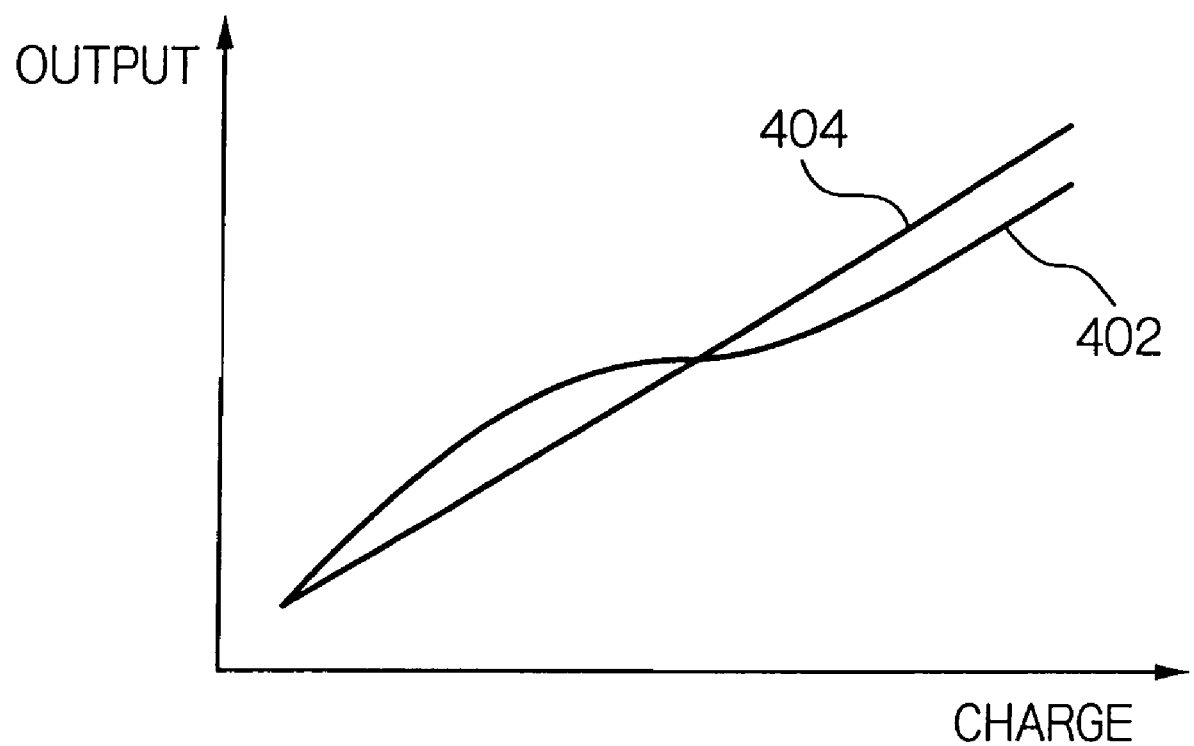

IMAGE PICKUP APPARATUS FOR ACCURATELY CORRECTING DATA OF SUB-IMAGES PRODUCED BY A SOLID-STATE IMAGE SENSOR INTO A COMPLETE IMAGE

BACKGROUND OF THE INVENTION

1. Field of the Invention

The present invention relates to a solid-state image pickup apparatus, and more particularly to such an apparatus for picking up an objective field by a solid-state image sensor and dividing the signal charges of an image representative of the field picked up into those of a plurality of sub-images to be outputted via a corresponding plurality of output circuits at a high transfer rate. The present invention also relates to a method for use in such a solid-state image pickup apparatus.

2. Description of the Background Art

Some of the conventional solid-state image pickup apparatuses have a solid-state image sensor of which the entire area of the imaging surface or photosensitive cell array is divided into a plurality of sub-areas in terms of reading out optical signal charges. The image signals representing the picked-up optical image of an objective field are rapidly read out as a plurality of sub-image signals respectively corresponding to the sub-areas. The image signals are then rapidly outputted via a plurality of output circuits. The output circuits include a preamplifier such as a floating diffusion amplifier (FDA).

The signals of sub-images are outputted separately from each other via correspondingly different output circuits. The output circuits have the amplifier characteristics thereof which may often be different or offset from each other. The picked-up sub-images thus have differences in characteristics of, e.g. offset, linearity, sensitivity, and dark noise, from each other. An entire frame of image made of the sub-images combined with each other may often have a dividing straight line in between which is clearly visible due to the colors, noise components and the like disadvantageously different there across.

Japanese patent laid-open publication No. 2002-125149 discloses an image pickup apparatus for obtaining respective average values of pixel data outputted from predetermined areas of the left, right, and left and right half imaging surfaces of an image sensor, the average values being in turn used to correct the imbalance in two outputs from the image sensor.

Japanese patent laid-open publication No. 2003-298950 discloses an image pickup apparatus in which a controller determines, for each channel, the level difference of two pilot signals from a solid-state image sensor, and a gain corrector corrects the level so that the level difference between the pilot signals on two channels are equal, thus increasing the detection accuracy of the input pilot signal and improving the level correction accuracy between the channels.

Japanese patent laid-open publication No. 2003-304454 discloses an image pickup apparatus in which the difference between a VOB signal level around the center of the image frame and the average of optical black (OB) signal levels in two horizontal optical black areas is divided by the number of the pixels of a horizontal line in the two divided imaging areas to provide the result of the calculation as a correction value. To or from the video signal, optical black signal, and pilot signal, the correction value is then added or subtracted for every predetermined number of horizontal pixels of the input signal for each channel, thus almost equalizing the output level characteristics of the divided imaging areas of the solid-state image sensor.

Japanese patent laid-open publication No. 2004-336244 teaches a correction apparatus that includes a gain adjustment means that adjusts levels of a plurality of image signals from a corresponding plurality of output circuits of the image sensor, and a microcomputer adapted to determine a correction coefficient for decreasing the level difference between a plurality of image signals based on temperature information, the gain adjustment means using the correction coefficient to decrease the level difference between the image signals, thereby correcting the image signals.

The conventional solid-state image pickup apparatuses output data of the sub-images via the output circuits distinct from each other, and correct the data of sub-images in dependence upon the outputted sub-images. The conventional apparatuses cannot determine which one of the sub-image signals is accurate or which one of the output circuits is defective. The correction thus cannot be done with reference to accurate one of the sub-images.

SUMMARY OF THE INVENTION

It is an object of the present invention to provide an improved solid-state image pickup apparatus for outputting a plurality of image signals respectively corresponding to the sub-areas of an imaging surface via a plurality of output circuits.

It is a more specific object of the present invention to provide such a solid-state image pickup apparatus which may determine the amplifier characteristics of the output circuits and use the characteristics to obtain the difference in offset, linearity, sensitivity, and dark noise between sub-images, thus accurately correcting the discontinuity between the sub-images.

In accordance with the present invention, there is provided a solid-state image pickup apparatus comprising: an image sensor having an imaging surface comprising a plurality of pixels for producing signal charge for photoelectric conversion to produce image data from the signal charge, the plurality of pixels comprising photosensitive cells arranged in a row and a column direction; and a signal processor for receiving the image data from the image sensor and processing the image data, the image sensor having an optical black area for providing black-level signal charge, the image sensor comprising a plurality of output circuits respectively corresponding to a plurality of sub-areas forming a frame of image, and a horizontal transfer path for horizontally transferring the signal charge from the pixels to one of the output circuits, the output circuits using the signal charge transferred from the horizontal transfer path to output the image data; the apparatus further comprising a controller for directing determination of amplifier characteristics of the output circuits or directing normal imaging, the image sensor being in response to the direction of the amplifier characteristics determination to transfer first signal charge to first one of the output circuits, by allowing the imaging surface to send the first signal charge acquired from all pixels to the horizontal transfer path, allowing the horizontal transfer path to horizontally transfer the first signal charge to the first output circuit, and allowing the first output circuit to use the first signal charge to output first image data, while the imaging surface sends the first signal charge comprising optical black signal charge from the optical black area to the horizontal transfer path, and the first output circuit outputs the first image data comprising first optical black data indicating the optical black signal charge, the signal processor comprising a characteristics determiner operative in response to the direction of the amplifier characteristics determination for using at least the first optical black data in the first image data to determine a plurality of amplifier characteristics of the output circuits, the image sensor being operative in response to the direction of the normal imaging to transfer second signal charge to each of the output circuits, by allowing the imaging surface to send the second signal charge from the pixels in each of the sub-areas to the horizontal transfer path, allowing the horizontal transfer path to horizontally transfer the second signal charge from each sub-area to the corresponding output circuit, and allowing the output circuits to use the second signal charge to output a plurality of sets of second image data, the signal processor being operative in response to the direction of the normal imaging to process the sets of second image data to correct the second image data based on the amplifier characteristics, and produce third image data indicating one whole image comprising the sets of second image data.

In accordance with the present invention, there is also provided a method of controlling a solid-state image pickup apparatus comprising: an imaging step of receiving signal charge from a plurality of pixels forming an imaging surface to produce image data from the signal charge, the pixels comprising photosensitive cells for photoelectric conversion and being arranged in a row and a column direction, and a signal processing step of receiving the image data from the imaging step and processing the image data; the imaging step using a plurality of output circuits respectively corresponding to a plurality of sub-areas forming the imaging surface and a horizontal transfer path for horizontally transferring the signal charge from the pixels to one of the output circuits, and outputting the image data from the outputs circuits based on the signal charge transferred from the horizontal transfer path; the method further comprising a control step of directing determination of amplifier characteristics of the output circuits or directing normal imaging, the imaging step transferring, in response to the direction of the amplifier characteristics determination, first signal charge to a first output circuit of the output circuits, by allowing the imaging surface to send the first signal charge acquired from all pixels to the horizontal transfer path, allowing the horizontal transfer path to horizontally transfer the first signal charge to the first output circuit, and allowing the first output circuit to use the first signal charge to output first image data, while receiving optical black signal charge from an optical black area in the imaging surface for producing black-level signal charge, and sending the first signal charge comprising the optical black signal charge to the horizontal transfer path, and outputting, from the first output circuit, the first image data comprising first optical black data indicating the optical black signal charge, the signal processing step comprising a characteristics determination step of using, in response to the direction of the amplifier characteristics determination, at least the first optical black data in the first image data to determine a plurality of amplifier characteristics of the output circuits, the imaging step transferring, in response to the direction of the normal imaging, second signal charge to each of the output circuits, by allowing the imaging surface to send the second signal charge from the pixels in each sub-area to the horizontal transfer path, allowing the horizontal transfer path to horizontally transfer the second signal charge from each sub-area to the corresponding output circuit and allowing the output circuits to use the second signal charge to output a plurality sets of second image data, the signal processing step processing, in response to the direction of the normal imaging, the sets of second image data, correcting the second image data based on the amplifier characteristics, and producing third image data indicating one whole image comprising the second image data.

According to the solid-state image pickup apparatus of the present invention, the image sensor may perform imaging with bidirectional, i.e. both left and right directional, charge transfer to acquire the left optical black data and right optical black data and with left directional charge transfer to acquire the left-transferred total optical black data, and the output circuit characteristics determiner may compare the right component of the total optical black data with the right optical black data, thus determining the amplifier characteristics of the left and right output circuits.

In the solid-state image pickup apparatus of the present invention, the output circuit characteristics determiner may compare the right component of the total optical black data with the right optical black data to detect, as the amplifier characteristics of the left and right output circuits, a difference in the basic level between the produced sub-images, and use a difference correction value based on the difference to correct each sub-image, thus obscuring the dividing line, correcting the shading characteristics of each output circuit, and accurately correct the discontinuity between the sub-images.

In addition, in the solid-state image pickup apparatus of the present invention, the output circuit characteristics determiner may compare the right component of the total optical black data with the right optical black data to detect, as the amplifier characteristics of the left and right output circuits, a difference in the dark noise, use the difference to calculate a noise reduction parameter, and use the parameter to correct the image quality difference between the sub-images due to the noise level difference.

According to the solid-state image pickup apparatus of the present invention, the optical black area in the image sensor may comprise a charge-generating pixel that provides produced data, the output circuit characteristics determiner may compare the right component of the total produced data with the right produced data to determine the amplifier characteristics of the left and right output circuits, and use the result to correct the image quality difference between the sub-images due to the sensitivity difference.

In the solid-state image pickup apparatus of the present invention, the optical black area may comprise a plurality of charge-generating pixels having different sensitivities that provide produced data, the output circuit characteristics determiner may compare the right component of the total produced data with the right produced data to determine the amplifier characteristics of the left and right output circuits, and use the result to correct the image quality difference between the sub-images due to the linearity difference.

BRIEF DESCRIPTION OF THE DRAWINGS

The objects and features of the present invention will become more apparent from consideration of the following detailed description taken in conjunction with the accompanying drawings in which:

FIG. 17 is a graph plotting produced data in the solid-state image pickup apparatus of another embodiment of the present invention.

DESCRIPTION OF THE PREFERRED EMBODIMENTS

With reference to the accompanying drawings, illustrative embodiments of the solid-state image pickup apparatus according to the present invention will be described in more detail.

Figure 1:
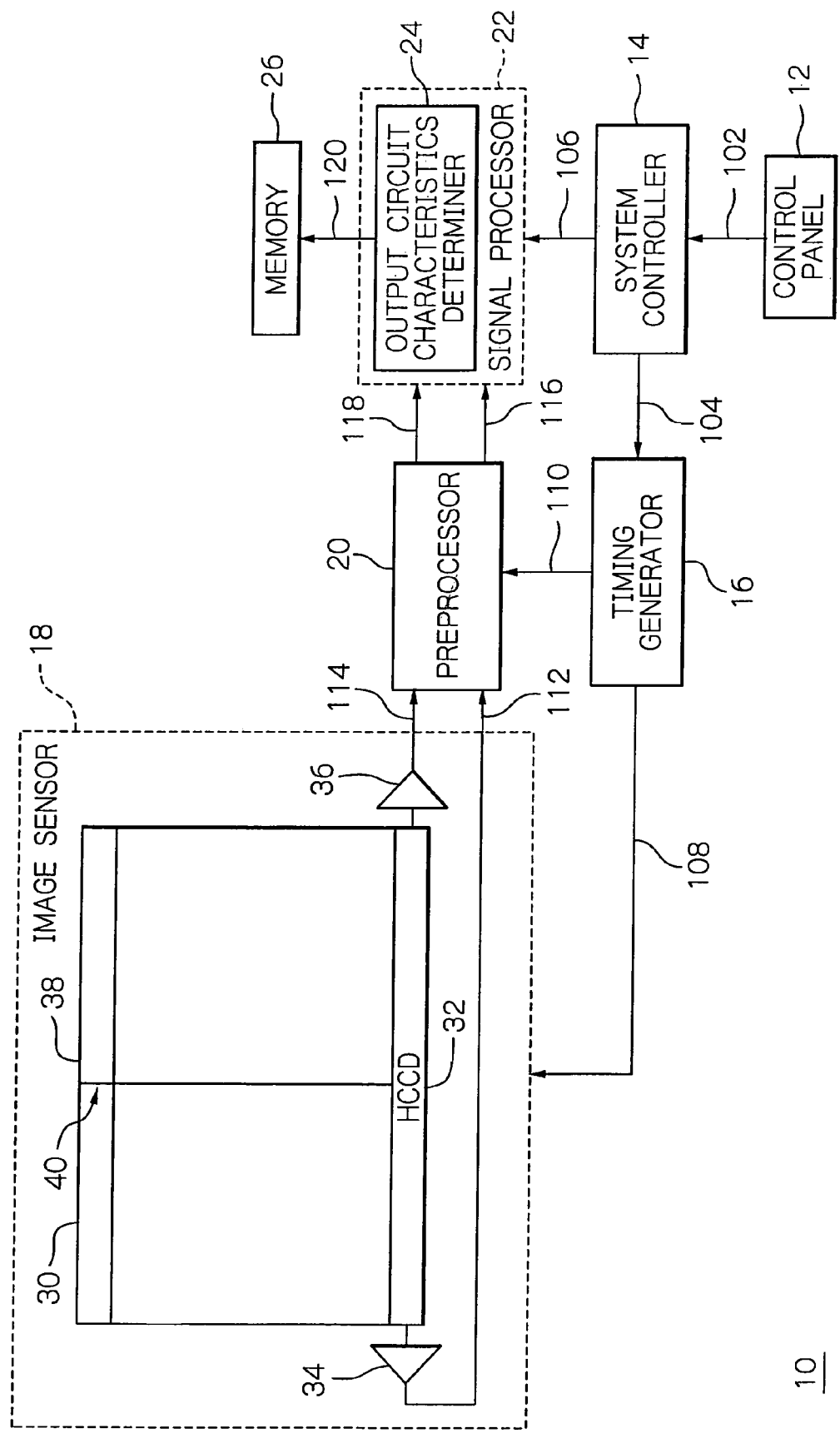
FIG. 1 is a schematic block diagram showing an embodiment of a solid-state image pickup apparatus of the present invention.

The solid-state image pickup apparatus 10 of the illustrative embodiment includes, as shown in FIG. 1, a system controller 14 and a timing generator 16 which are adapted in response to a control panel 12, when manipulated, to allow an image sensor 18 to pick up an optical image formed by incident light from an objective field to be captured to produce sub-images, or divided images, into which the optical image is divided, and which are in turn processed by a preprocessor 20 and a signal processor 22 to provide a single complete image. In particular, the apparatus 10 includes an output circuit characteristics determiner 24 adapted to determine the amplifier characteristics of output circuits. It is to be noted that part or components not directly relevant to understanding the present invention are neither shown nor will be described specifically in order to avoid redundancy.

Figure 2:
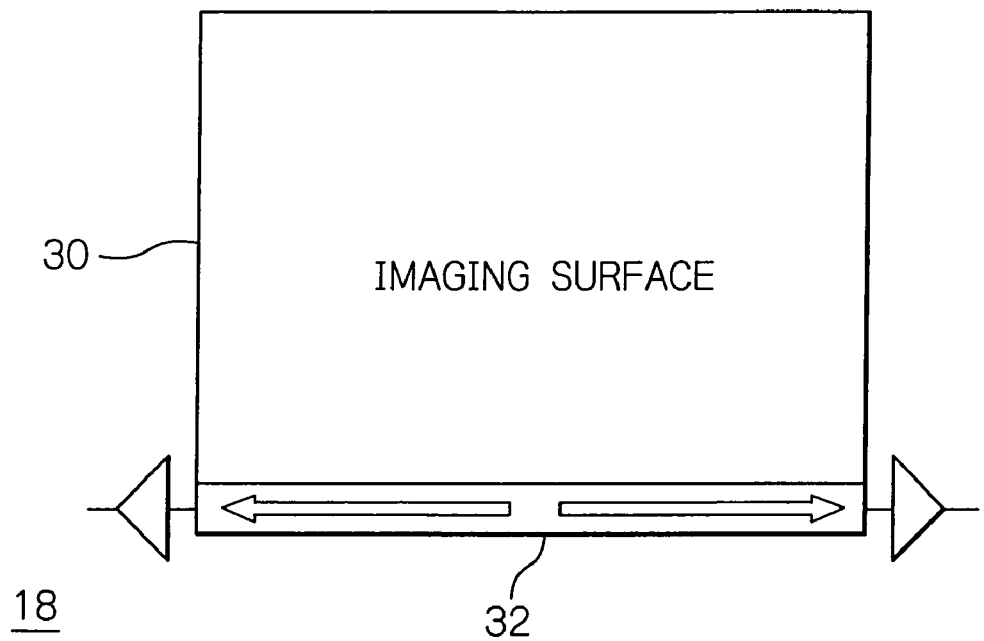
FIG. 2 is a schematic diagram of the bidirectional transfer of a signal charge in the image sensor of the solid-state image pickup apparatus of the illustrative embodiment shown in FIG. 1.
Figure 3:
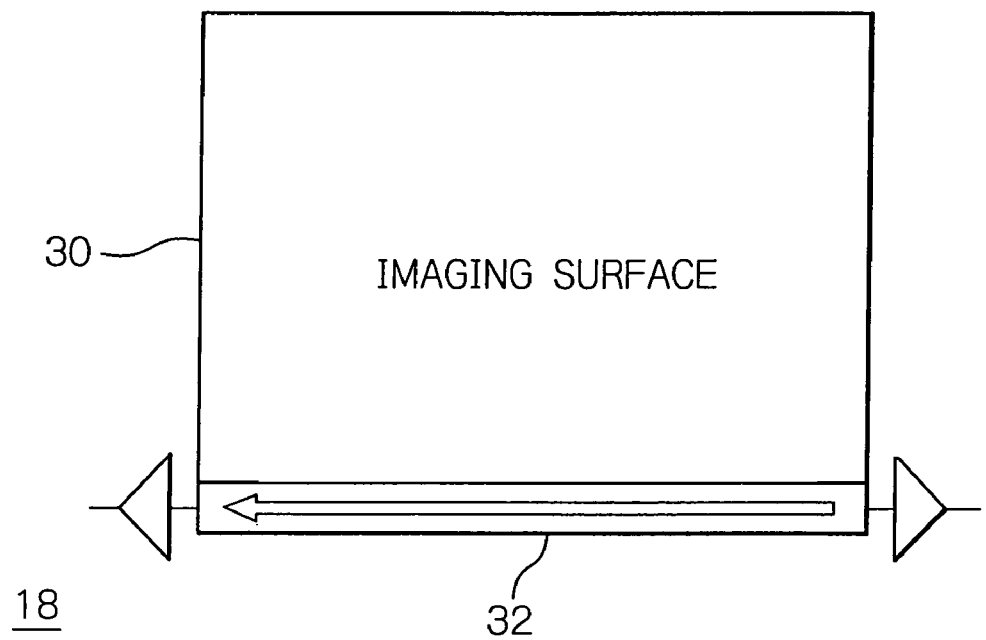
FIGS. 3 and 4 are schematic diagrams of the left and right directional transfer, respectively, of a signal charge in the image sensor of the solid-state image pickup apparatus of the illustrative embodiment shown in FIG. 1.
Figure 4:
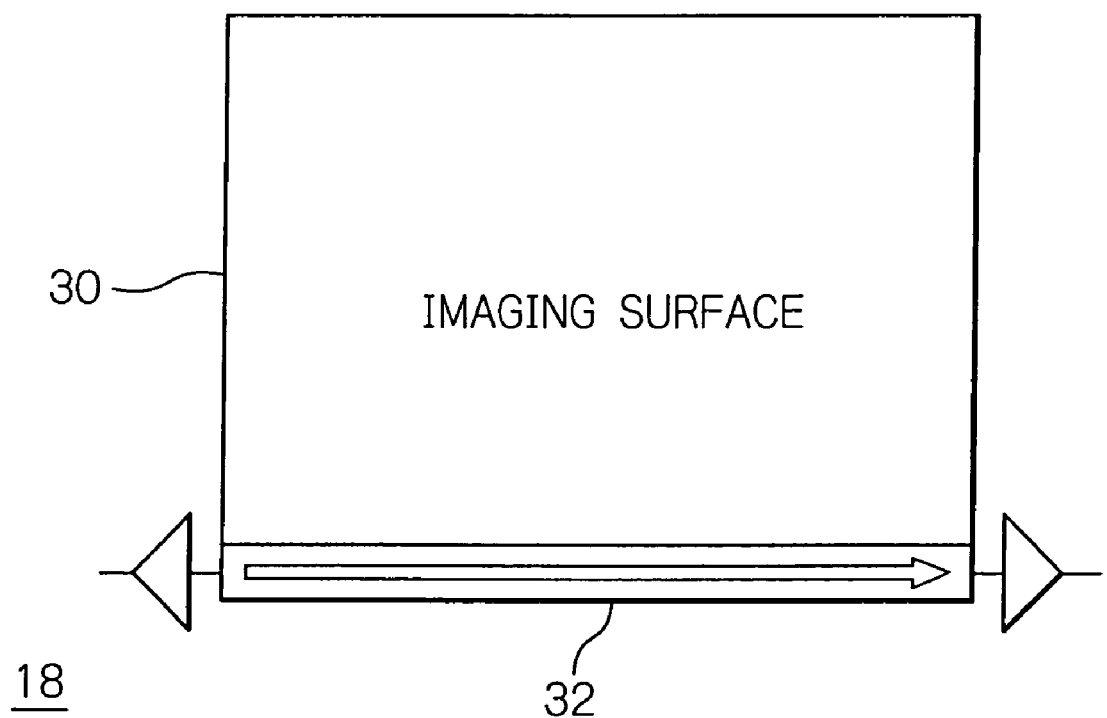

In the apparatus 10, the image sensor 18 is adapted to horizontally transfer the signal charge generated in and read out from an imaging surface, or photosensitive cell array, 30 over a horizontal transfer path 32. The signal charge may be, transferred in both left and right directions, as shown in FIG. 2, to provide the sub-images. The charge may also be transferred only in the left or right direction, as shown in FIG. 3 or 4, respectively, to provide one complete image.

The control panel 12 is a manual operation device that is adapted to receive instructions from an operator. The control panel 12 has a function of being responsive to the state of a manual operation by the operator such as the stroke operation of a shutter release key, not shown, to provide a corresponding operation signal 102 to the system controller 14. Signals are designated by reference numerals attached to connections on which they appear.

The system controller 14 is a general controller adapted to control the operation of the entire pickup apparatus 10 in response to the operation signal 102 fed from the control panel 12. The system controller 14 generates, in response to the operation signal 102, control signals 104 and 106. The controller 14 then supplies the signals 104 and 106 to the timing generator 16 and the signal processor 22, respectively, for controlling them.

The system controller 14 of the instant embodiment may generate the control signals 104 and 106 that instruct the image sensor 18 to carry out the image pickup of bidirectional, i.e. both left and right directional, or left or right directional imagewise signal charge transfer. The system controller 14 may also generate, when the apparatus 10 determines the amplifier characteristics of the output circuit, the control signal 106 that also instructs the output circuit characteristics determination.

The timing generator 16 may include an oscillator that is adapted to generate the basic clock for operating the apparatus 10. The timing generator 16 may supply the basic clock to each portion, although not shown. The timing generator 16 is in response to the control signal 104 fed from the system controller 14 to generate timing signals 108 and 110. The timing generator 16 may generate, for example, the timing signal 108 that includes a vertical and a horizontal sync signal, and a vertical and a horizontal drive signal and the like, and supply the signal 108 to the image sensor 18. The timing generator 16 may also generate the timing signal 110 that includes a sampling pulse for the correlated double sampling and a converter clock for analog-to-digital conversion and the like, and supply the signal 110 to the preprocessor 20.

The timing generator 16 of the present embodiment may generate, in response to the control signal 104, the timing signal 108 and 110 that control the image pickup of the bidirectional, or the left or right directional charge transfer.

The image sensor 18 includes the imaging surface or photosensitive cell array 30 that may form electronic charge of a single complete frame of image, or whole image. The image sensor 18 has the function of converting the optical image of a captured imaging field into corresponding electrical signal charge. The image sensor 18 is also adapted to output the electrical signal charge via the horizontal transfer path (HCCD) 32 and the left and right output circuits 34 and 36 in the form of analog electrical signals 112 and 114, respectively. The imaging surface 30 of the illustrative embodiment includes an optical black (OB) area 38 that provides a signal charge representing the black level. In this embodiment, the image sensor 18 may be any type of image sensor such as a charge-coupled device (CCD) or a metal-oxide semiconductor (MOS) device.

The imaging surface 30 includes a plurality of photosensitive cells, or pixels, which form one whole image. Each of the pixels is an optical sensor that is adapted to sense incident light beams and photoelectrically transduce the light beams into electrical signal charge corresponding to the amount of the received light beams. The pixel may be implemented by a photo diode. The pixels, each including a red R, a green G, and a blue B color filter, are arranged in a matrix.

The imaging surface 30 also includes a plurality of vertical transfer paths (VCCD), not shown. Each of the vertical transfer paths is controlled by the timing signal 108 to vertically transfer the signal charge read out from the pixels to the horizontal transfer path 32, the signal charge being in turn developed in the form of electrical signal.

The horizontal transfer path 32 is adapted to be controlled by the timing signal 108 to operate, for example, in a two-phase drive or a four-phase drive mode, and horizontally transfer the signal charge transferred from the vertical transfer paths to the left or right output circuit 34 or 36.

Figure 5:
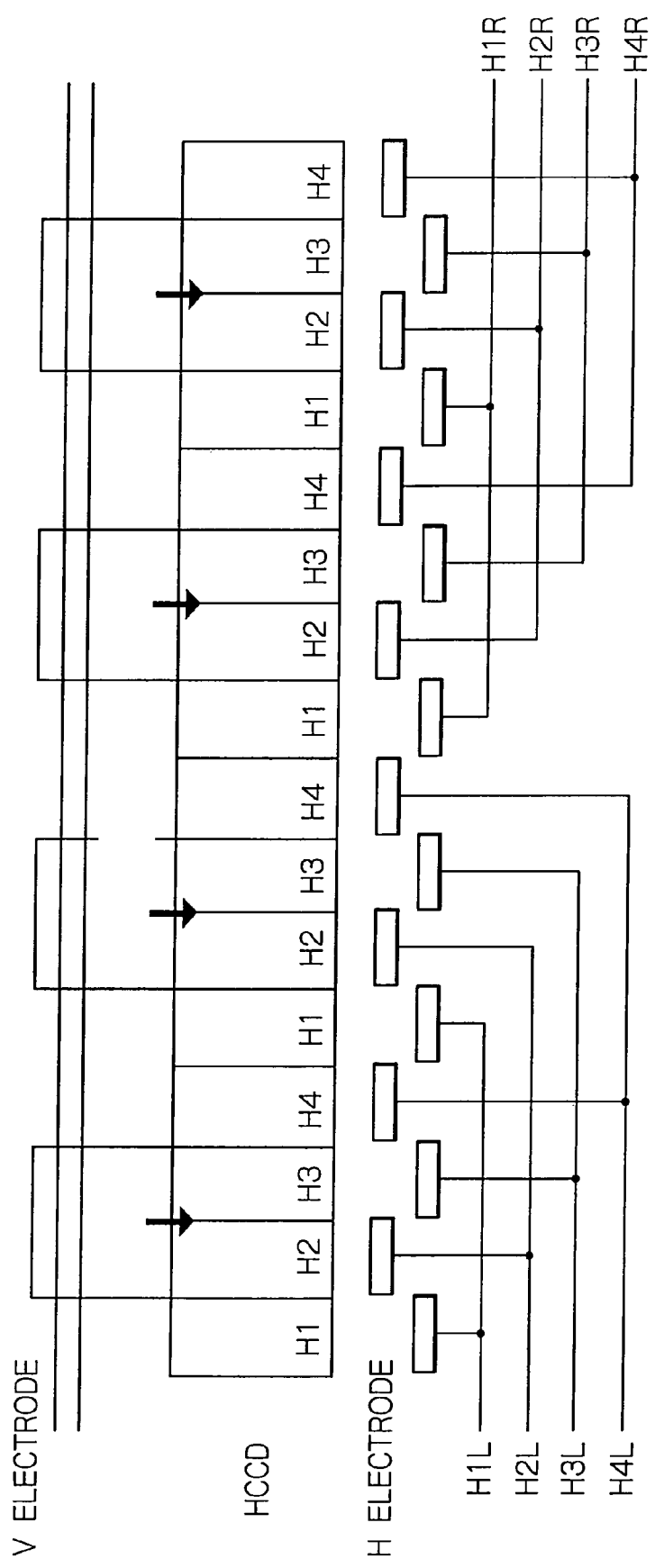
FIG. 5 schematically illustrates a horizontal transfer path in the solid-state image pickup apparatus of the illustrative embodiment.

For example, the horizontal transfer path 32 in the four-phase drive mode, as shown in FIG. 5, includes horizontal electrodes H1, H2, H3, and H4 that are repeatedly provided. These electrodes are driven by different horizontal drive signals. In the horizontal transfer path 32, the horizontal electrodes are also driven by different horizontal drive signals depending on whether the electrodes are connected to the vertical transfer paths on the left or right of the dividing line 40 of the imaging surface 30. The horizontal electrodes may thus transfer the signal charge from the vertical transfer paths in both or either of the left and right directions.

In the horizontal transfer path 32, as shown in FIG. 5, the horizontal electrodes H1, H2, H3, and H4 on the left side of the dividing line 40 receive the horizontal driving signals H1L, H2L, H3L, and H4L, respectively. On the other hand, the horizontal electrodes H1, H2, H3, and H4 on the right side of the dividing line 40 receive the horizontal driving signals H1R, H2R, H3R, and H4R, respectively.

Figure 6:
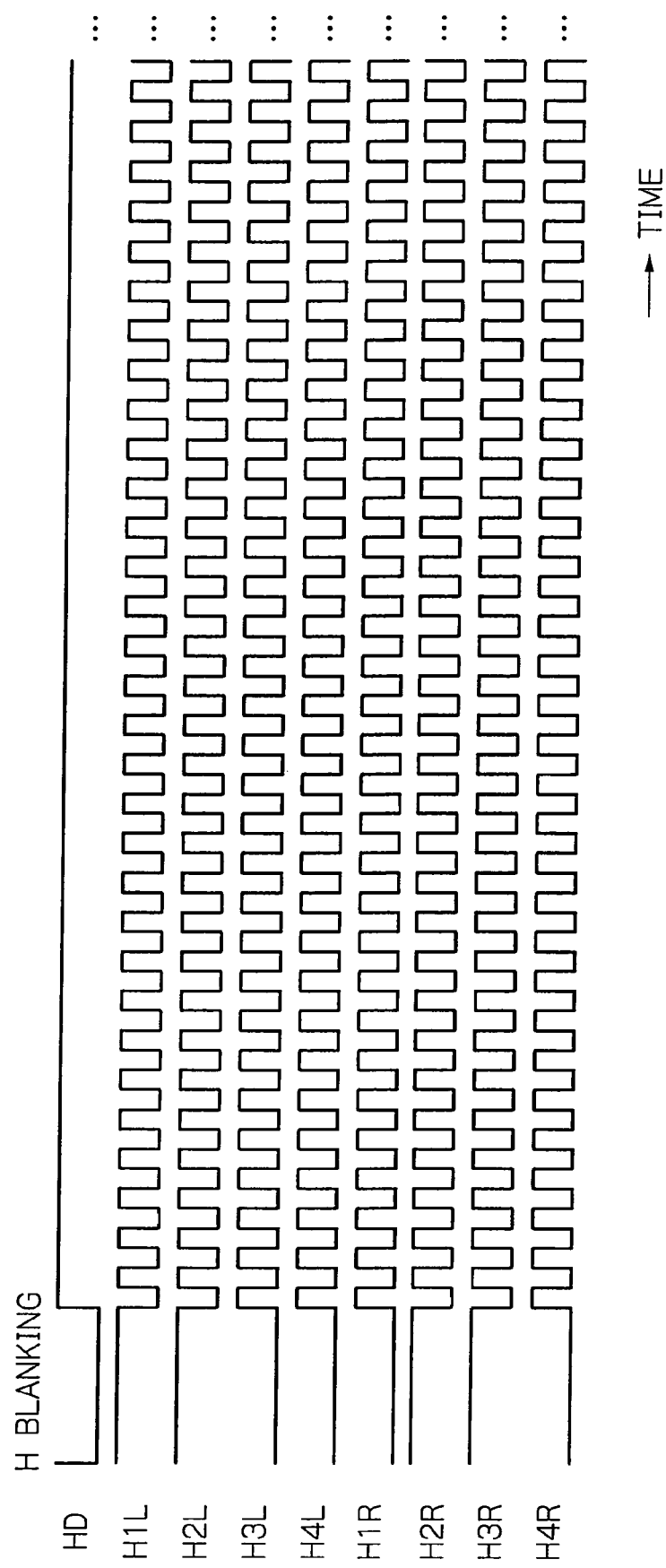
FIG. 6 is a timing chart illustrating the operational waveforms on the horizontal transfer path shown in FIG. 5 in the bidirectional transfer in the image sensor shown in FIG. 2.
Figure 7:
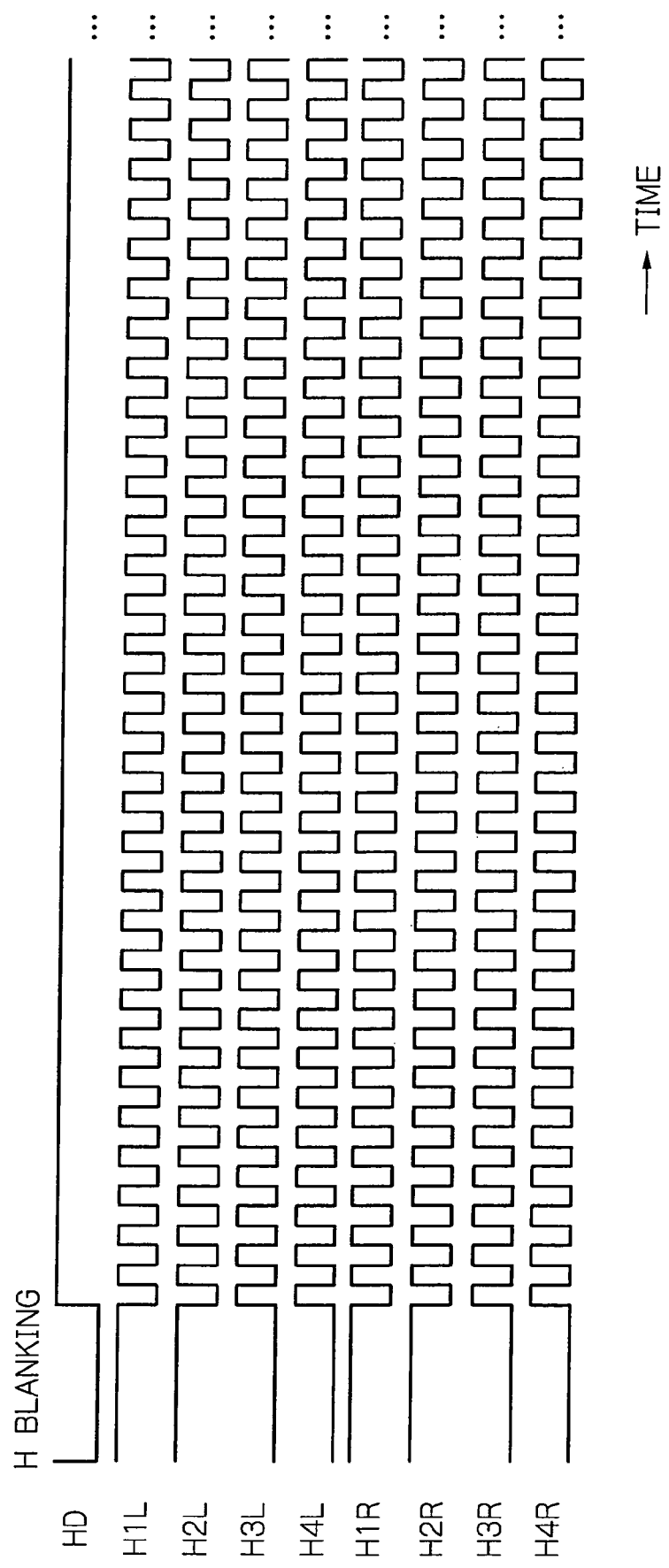
FIGS. 7 and 8 are timing charts illustrating the operational waveforms on the horizontal transfer path shown in FIG. 5 in the left and right directional transfer in the image sensor shown in FIGS. 3 and 4, respectively.
Figure 8:
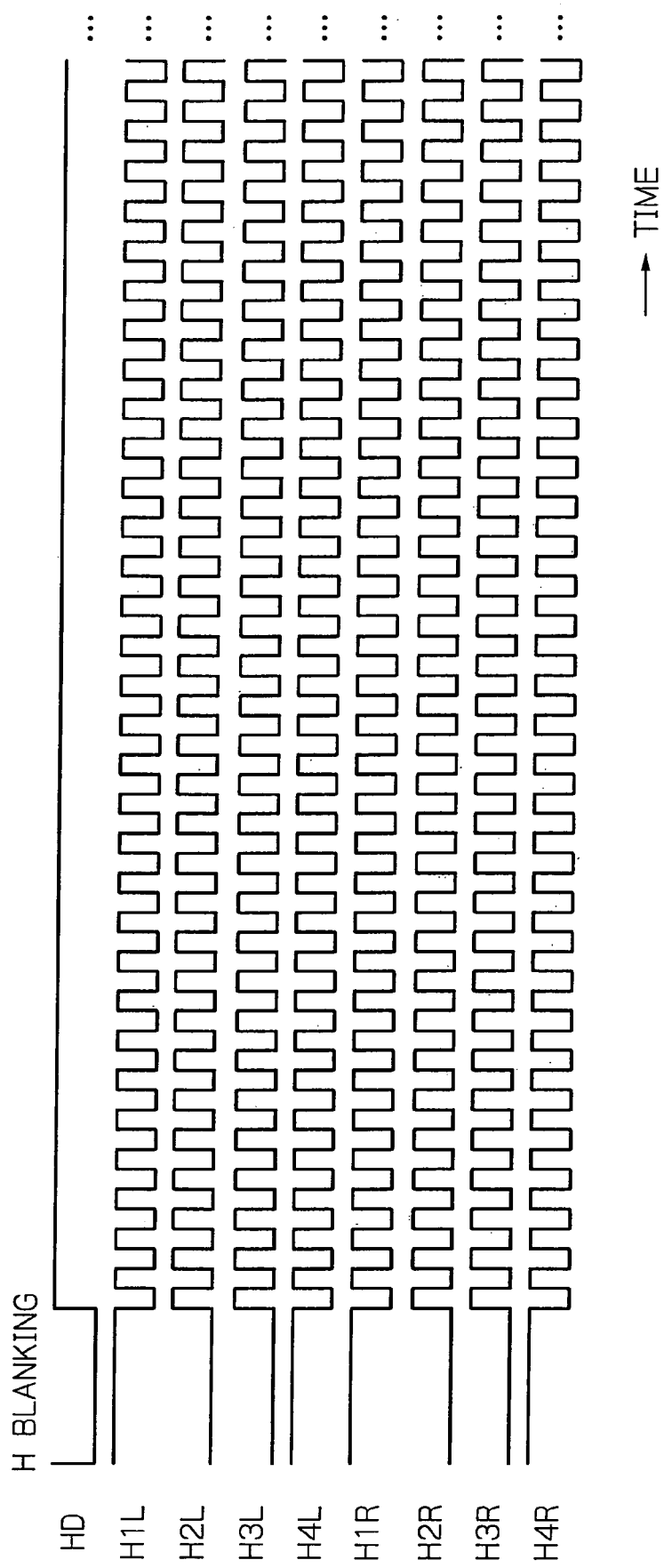

The horizontal transfer path 32 may be of the type of starting the horizontal transfer in response to the horizontal sync signal. Such a type of horizontal transfer path may be operative, in order to transfer the signal charge in both left and right direction, by inputting, for example, the horizontal driving signals H1L, H2L, H3L, H4L, H1R, H2R, H3R, and H4R, as shown in FIG. 6. Such a type of horizontal transfer path may be operative, in order to transfer the signal charge in the left or right direction, by inputting the horizontal driving signals H1L, H2L, H3L, H4L, H1R, H2R, H3R, and H4R, as shown in FIG. 7 or 8, respectively.

The left and right output circuits 34 and 36 are adapted to convert the signal charge transferred from the horizontal transfer path 32 into the corresponding analog electrical signals 112 and 114, respectively, and output the signals. The output circuits 34 and 36 may be implemented by, for example, a floating diffusion amplifier (FDA).

The image sensor 18 of the present embodiment is controlled by the timing signal 108 to allow the pixels formed by the imaging surface 30 to photoelectrically convert the optical image of the field into the corresponding signal charge, and allow the vertical transfer paths to vertically transfer the charge to the horizontal transfer path 32.

In response to the timing signal 108 indicating the bidirectional transfer, the horizontal transfer path 32 of this embodiment horizontally transfers the signal charge from the vertical transfer paths in the area on the left side of the dividing line 40 on the imaging surface 30 to the left output circuit 34, and also horizontally transfers the signal charge from the vertical transfer paths in the area on the right side to the right output circuit 36. In response to the timing signal 108 indicating the left directional transfer, the horizontal transfer path 32 horizontally transfers the signal charge from all vertical transfer paths in the imaging surface 30 to the left output circuit 34. In response to the timing signal 108 indicating the right directional transfer, the horizontal transfer path 32 horizontally transfers the signal charge from all vertical transfer paths in the imaging surface 30 to the right output circuit 36. The area on the left or right side of the dividing line 40 on the imaging surface 30 may sometimes be referred to as sub-area or divided area.

For example, the image sensor 18 receives, in response to the timing signal 108 indicating the bidirectional transfer, the left and right image data from the pixels on the left and right sides of the dividing line 40 on the imaging surface 30, respectively, and produces the analog electrical signals 112 and 114 representing the left and right image data, respectively. The left image data includes the left optical black data from the left side of the dividing line 40 in the optical black area 38. The right image data includes the right optical black data from the right side of the dividing line 40 in the optical black area 38.

The image sensor 18 receives, in response to the timing signal 108 indicating the left directional transfer, the left-transferred total image data from all pixels on the imaging surface 30 to produce the analog electrical signal 112 representing total image data. Similarly, the image sensor 18 obtains, in response to the timing signal 108 indicating the right directional transfer, the right-transferred total image data from all pixels on the imaging surface 30 to produce the analog electrical signal 114 representing total image data. The total image data includes the total optical black data from the entire optical black area 38.

The preprocessor 20 is controlled by the timing signal 110 to provide the analog signal processing to the analog electrical signals 112 and 114 in the respective corresponding preamplifiers. The preprocessor 20 provides the analog electrical signal 112 and 114 with, for example, a correlated double sampling for noise reduction, gain control amplification, and analog-to-digital conversion, thus outputting the digital image signals 116 and 118.

The signal processor 22 is adapted for being responsive to the control signal 106 from the system controller 14 to provide the digital image signal 116 and 118 from the preprocessor 20 with the digital signal processing. The signal processor 22 may be adapted to provide digital signal processings such as offset correction, white balance adjustment, gamma correction, and synchronization on the digital image signals 116 and 118.

The signal processor 22 of the instant embodiment particularly includes the output circuit characteristics determiner 24 functioning as determining the amplifier characteristics of the left and right output circuits 34 and 36. The signal processor 22 corrects, according to the amplifier characteristics determined by the output circuit characteristics determiner 24, the left image data in the digital image signal 116 and the right image data in the digital image signal 118, and combines the corrected left and right images with each other to produce the digital image signal representing one whole frame of image.

The signal processor 22 may be adapted to supply the combined digital image signal to a display device and a recording medium, not shown, for display and record, respectively.

In response to the control signal 106 indicating the output circuit characteristics determination, the output circuit characteristics determiner 24 of the illustrative embodiment acquires the left and right optical black data in the digital image signals 116 and 118, respectively, as well as the total optical black data transferred in the left or right direction in the digital image signal 116 or 118, respectively, and compares the total optical black data with the left optical black data or right optical black data, thus determining the amplifier characteristics 120 of the left and right output circuits 34 and 36, the characteristics 120 being then stored in the memory 26.

A description will now be given of how the solid-state image pickup apparatus 10 of the illustrative embodiment determines the amplifier characteristics of the output circuit. In the image pickup apparatus 10, when initial data is set in advance, such as before shipped or when booted, the operator operates the control panel 12 so as to supply the operation signal 102 instructing the output circuit characteristics determination to the system controller 14.

The system controller 14 directs, in response to the operation signal 102, the output circuit characteristics determination, together with the image pickup with bidirectional and left directional charge transfer, sequentially. First, the system controller 14 generates the control signal 104 indicating the image pickup with bidirectional charge transfer and supplies the signal 104 to the timing generator 16, and also generates the control signal 106 indicating the image pickup with bidirectional charge transfer and the output circuit characteristics determination and supplies the signal 106 to the signal processor 22.

The timing generator 16 then generates, in response to the control signal 104, the timing signals 108 and 110 indicating the bidirectional transfer, and supplies the signals 108 and 110 to the image sensor 18 and the preprocessor 20, respectively.

The image sensor 18 picks up the optical image of an imaging field formed on the imaging surface 30 according to incident light. The image sensor 18 reads out, in response to the timing signal 108, the signal charge from the pixels of the imaging surface 30. In this embodiment, the image sensor 18 particularly reads out the signal charge from the pixels of the optical black area 38, which is unaffected by incident light.

In the instant illustrative embodiment, the timing signal 108 indicates the bidirectional transfer, as described above. The image sensor 18 thus transfers the signal charge read out from the left side of the dividing line 40 on the imaging surface 30 to the horizontal transfer path 32 to produce, via the floating diffusion amplifier 34, the analog electrical signal 112 representing the left image data including the left optical black data, and also transfers the signal charge read out from the right side to the horizontal transfer path 32 to produce, via the floating diffusion amplifier 36, the analog electrical signal 114 representing the right image data including the right optical black data.

The analog electrical signals 112 and 114 are supplied to the preprocessor 20, which provides, in response to the timing signal 110, the signals 112 and 114 with preprocessings and the analog-to-digital conversion to produce the digital image signals 116 and 118 in the respective corresponding preamplifiers.

The digital image signals 116 and 118 are supplied to the signal processor 22, which in turn provides the signals 116 and 118 with the required digital signal processings. In the illustrative embodiment, the control signal 106 indicates the output circuit characteristics determination and the bidirectional transfer, as described above. The left optical black data and right optical black data in the digital image signals 116 and 118 respectively are thus stored in the memory 26.

Next, the system controller 14 generates the control signal 104 indicating the image pickup with left directional charge transfer and supplies the signal 104 to the timing generator 16, and also generates the control signal 106 indicating the image pickup with left directional charge transfer and the output circuit characteristics determination and supplies the signal 106 to the signal processor 22.

As in the bidirectional transfer, the timing generator 16 generates, in response to the control signal 104, the timing signals 108 and 110 indicating the left directional transfer and supplies the signals 108 and 110 to the image sensor 18 and the preprocessor 20, respectively.

The image sensor 18 reads out, as in the bidirectional transfer, the signal charge from the pixels in the imaging surface 30. The image sensor 18 transfers, in response to the timing signal 108 indicating the left directional transfer, the signal charge read out from all pixels in the imaging surface 30 to the horizontal transfer path 32 to produce, via the floating diffusion amplifier 34, the analog electrical signal 112 representing total image data including the total optical black data.

The analog electrical signal 112 representing total image data is then supplied, as in the bidirectional transfer, to the preprocessor 20, which provides, in response to the timing signal 110, the signal 112 with preprocessings and the analog-to-digital conversion to produce the digital image signal 116.

The digital image signal 116 representing total image data is supplied to the signal processor 22, which provides the signal 116 with the required digital signal processing. In this embodiment, the control signal 106 indicates the output circuit characteristics determination and the left directional transfer, as described above. The output circuit characteristics determiner 24 thus reads out from the memory 26 the left optical black data and the right optical black data, compares the data with the total optical black data in the digital image signal 116 to determine the amplifier characteristics 120 of the left and right output circuits 34 and 36.

Figure 9:
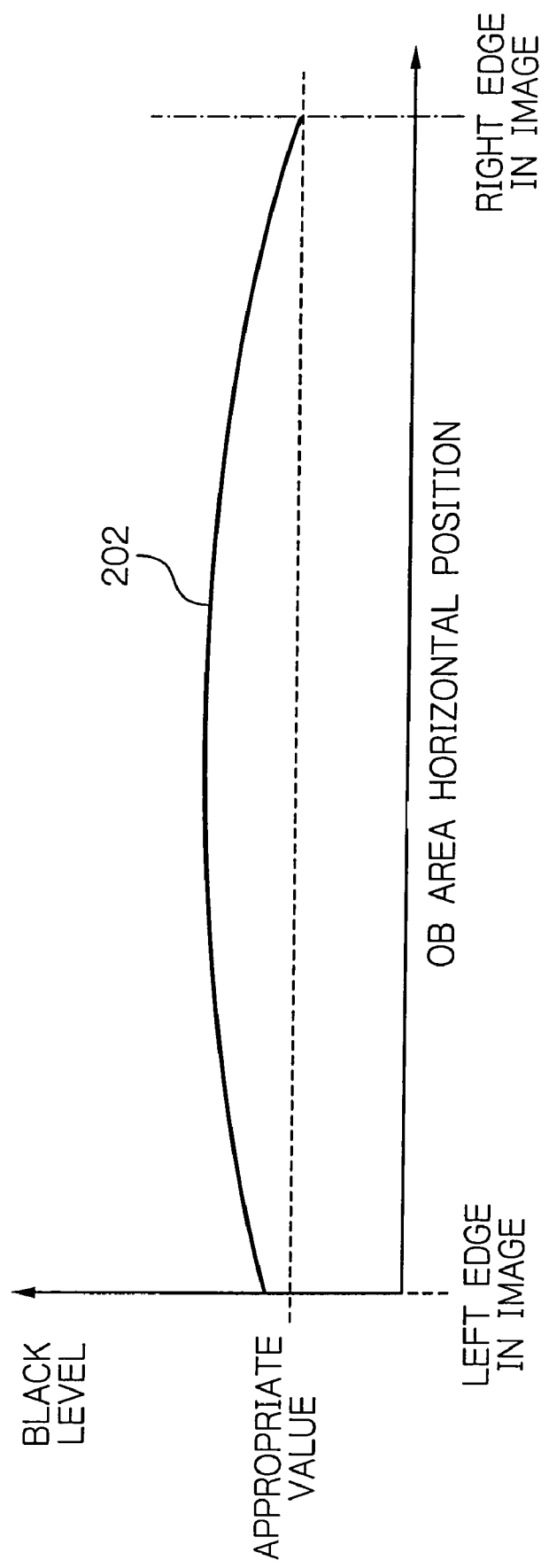
FIG. 9 is a graph plotting left-transferred total optical black data acquired in the left directional transfer in the image sensor shown in FIG. 3.
Figure 10:
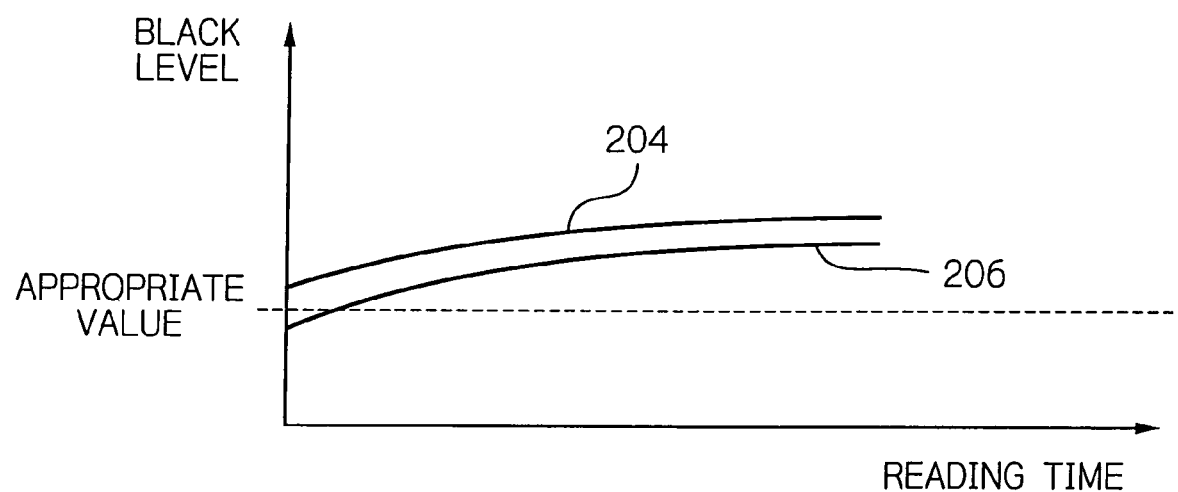
FIG. 10 is a graph plotting left and right optical black data acquired in the bidirectional transfer in the image sensor shown in FIG. 2.

FIG. 9 shows an example of the black level of the total optical black data 202 acquired by the left directional transfer in the image sensor 18. The black level of the total optical black data is higher on the left side of the optical black area than on the right side, i.e., the left side is darker than the right side. Both levels are still above the appropriate value. FIG. 10 shows an example of the black level of the left optical black data 204 and the right optical black data 206 acquired by the bidirectional transfer in the image sensor 18. From FIG. 10, it is understood that the black level of the right optical black data 206 is below the appropriate value. It can thus be seen that the left and right output circuits 34 and 36 have amplifier characteristics where the right optical black data 206 is outputted at a lower level than the left optical black data 204.

The total optical black data is outputted from the floating diffusion amplifier 34. Thus, the left component of the total optical black data that is acquired from the left side of the dividing line 40 in the optical black area 38 is the same as the left optical black data. The output circuit characteristics determiner 24 thus compares the right component of the total optical black data that is acquired from the right side of the dividing line 40 in the optical black area 38 with the right optical black data, thus determining the amplifier characteristics 120 of the left and right output circuits 34 and 36. The determiner 24 then stores the amplifier characteristics 120 in the memory 26.

When the apparatus 10 is subsequently used in the normal imaging mode, the signal processor 22 reads out the amplifier characteristics 120 from the memory 26, the digital image signal 116 or 118 acquired in the normal imaging mode is corrected using the amplifier characteristics 120, and the corrected digital image signals 116 and 118 are combined.

The apparatus 10 of the illustrative embodiment may be adapted to determine the amplifier characteristics of the output circuit in the reverse order for imaging where the image pickup with bidirectional charge transfer is done after the image pickup with left directional charge transfer. The apparatus 10 may also be adapted to determine the amplifier characteristics of the output circuit to read as follows. The image pickup with right directional charge transfer is done rather than the image pickup with left directional charge transfer. The image sensor 18 thus acquires the right-transferred total optical black data. The output circuit characteristics determiner 2A4 then compares the left component of the right-transferred total optical black data with the left optical black data and determines the amplifier characteristics 120 of the left and right output circuits 34 and 36.

In an alternative embodiment, the solid-state image pickup apparatus 10 may be adapted for determining the amplifier characteristics of the output circuit to read as follows. The image sensor 18 acquires the left-transferred total optical black data by the image pickup with left directional charge transfer and the right-transferred total optical black data by the image pickup with right directional charge transfer. The output circuit characteristics determiner 24 then compares the left- and right-transferred total optical black data and determines the amplifier characteristics 120 of the left and right output circuits 34 and 36.

In that case, the system controller 14 determines the output circuit characteristics by sequentially directing the image pickup with left directional charge transfer and the image pickup with right directional charge transfer. Specifically, the controller 14 first generates the control signal 104 indicating the image pickup with left directional charge transfer and supplies the signal 104 to the timing generator 16. The controller 14 then generates the control signal 104 indicating the image pickup with right directional charge transfer and supplies the signal 104 to the timing generator 16.

Then, the image sensor 18 first produces the analog electrical signal 112 representing the total image data including the total optical black data by the left directional transfer, and then produces the analog electrical signal 114 representing the total image data including the total optical black data by the right directional transfer.

The signal processor 22 of this alternative embodiment is first supplied with the digital image signal 116 representing the left-transferred total image data. The processor 22 then stores the total optical black data in the left-transferred total image data in the memory 26. The signal processor 22 is next supplied with the digital image signal 118 representing the right-transferred total image data. The output circuit characteristics determiner 24 then reads out the left-transferred total optical black data from the memory 26, and compares that data with the total optical black data in the right-transferred total image data and calculates the amplifier characteristics 120 of the left and right output circuits 34 and 36.

Figure 11:
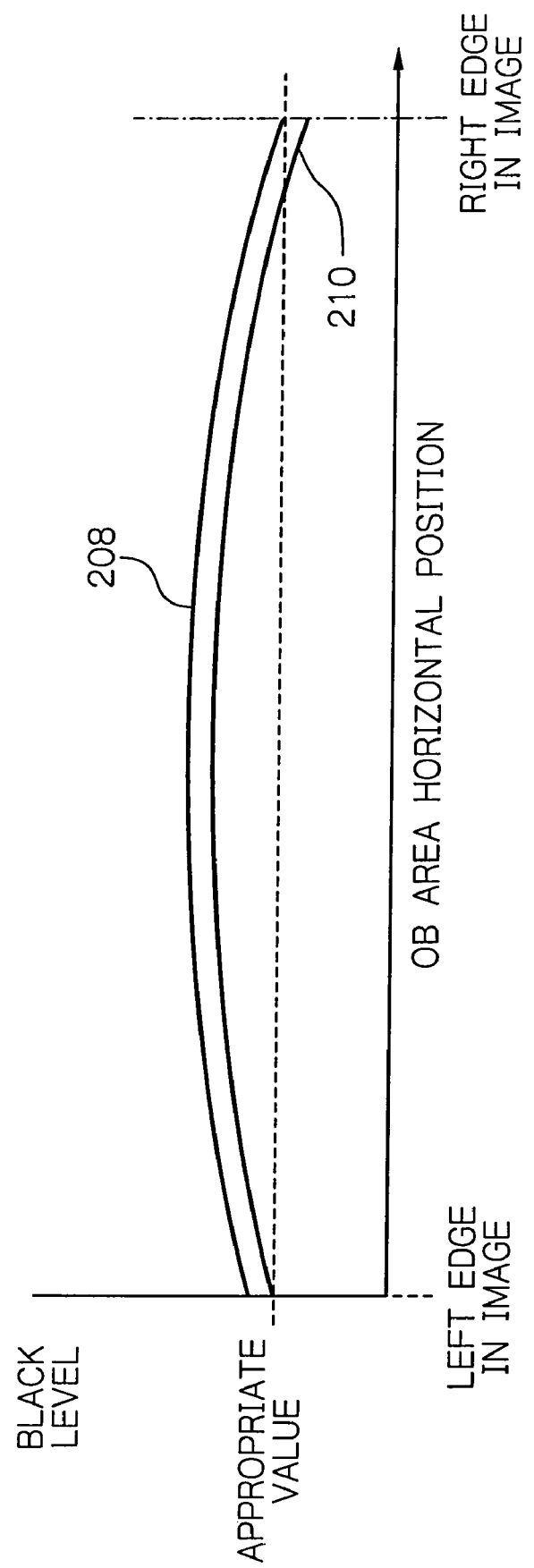
FIG. 11 is a graph plotting left- and right-transferred total optical black data acquired in the left and right directional transfer, respectively, in the solid-state image pickup apparatus of an alternative embodiment of the present invention.

FIG. 11 shows an example of the black levels of the left-transferred total optical black data 208 and the right-transferred total optical black data 210. The total optical black data has black levels that are higher in the left side of the optical black area than in the right side, i.e., the left side is darker than the right side. The right-transferred total optical black data 210 has a black level that is totally and uniformly lower than that of the left-transferred total optical black data 208. This means amplifier characteristics of the left output circuit 34 that provide outputs at lower level than the right output circuit 36.

The output circuit characteristics determiner 24 compares the left-transferred total optical black data in the digital image signal 116 and the right-transferred total optical black data in the digital image signal 118 and determines the amplifier characteristics 120 of the left and right output circuits 34 and 36.

Figure 12:
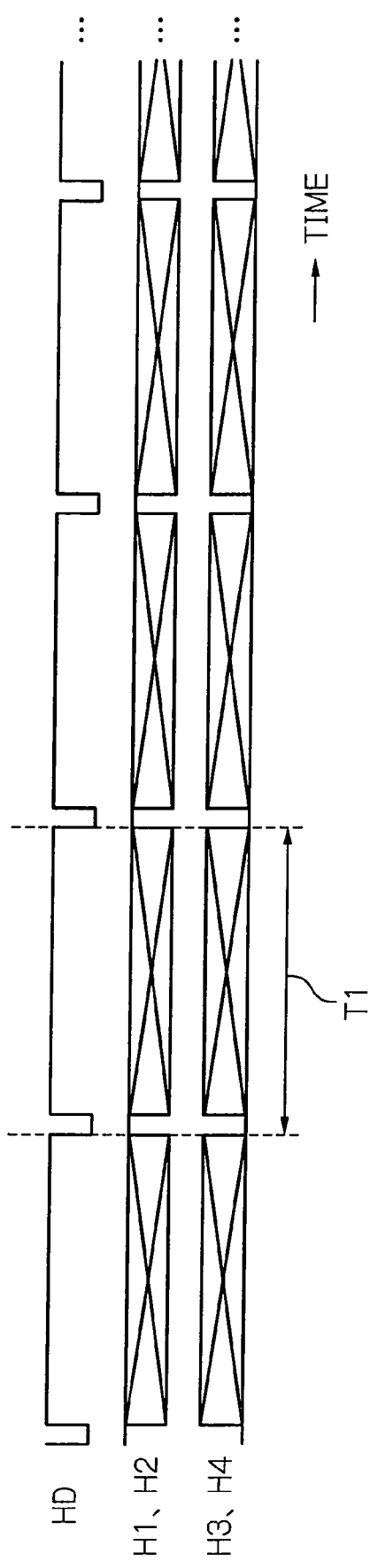
FIG. 12 is a timing chart illustrating the operational waveforms of the horizontal transfer path shown in FIG. 5 in the left directional transfer in the image sensor shown in FIG. 3.
Figure 13:
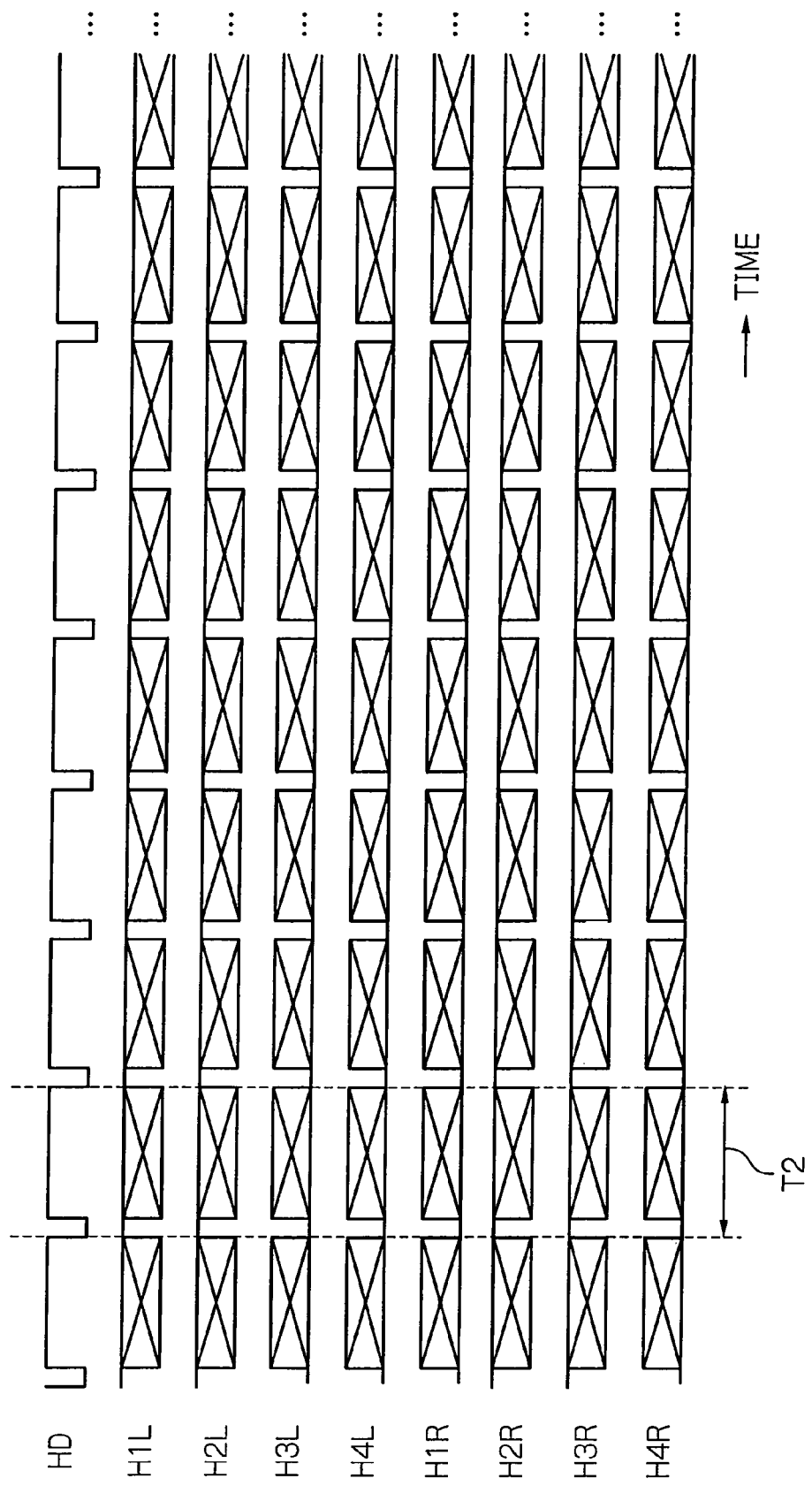
FIG. 13 is a timing chart illustrating the operational waveforms of the horizontal transfer path shown in FIG. 5 in the bidirectional transfer in the image sensor shown in FIG. 2.

When the image sensor 18 in the apparatus 10 uses the horizontal transfer path 32 in the four-phase drive mode to do the left directional transfer, signal charge transfer for one whole image is done in a predetermined period T1, as shown in FIG. 12. The signal charge transfer for one whole image in the left transfer is done in a predetermined period T1 that is the same in the right directional transfer. When, however, the image sensor 18 uses the horizontal transfer path 32 in the four-phase drive mode to do the bidirectional transfer, the signal charge transfer for one whole image may be done in a period T2 that is half as long as the period T1, as shown in FIG. 13.

Figure 14:
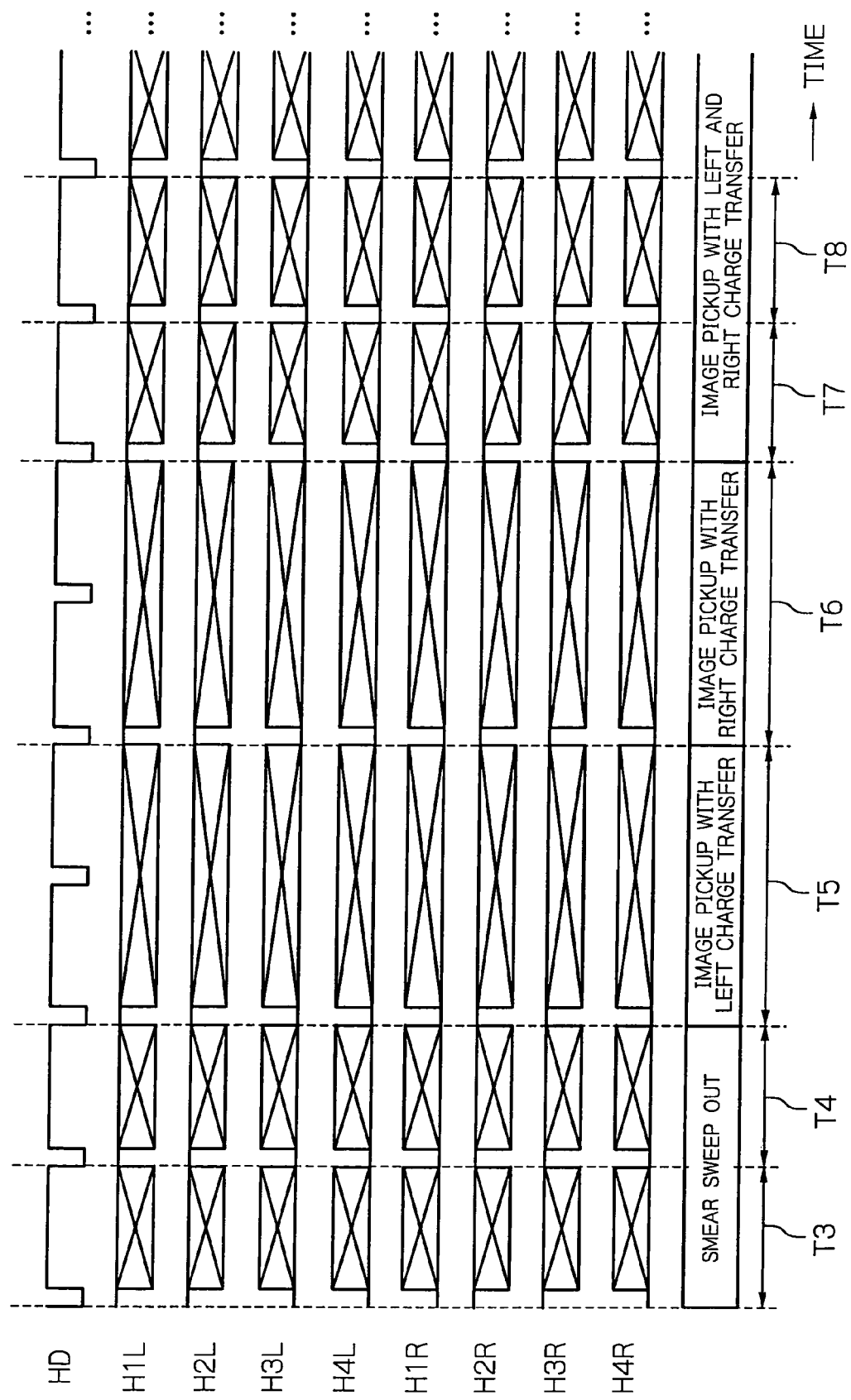
FIG. 14 is a timing chart illustrating the operation waveforms of the horizontal transfer path shown in FIG. 5 in the solid-state image pickup apparatus shown in FIG. 11.

Only when determining the output circuit characteristics, the image sensor 18 of this embodiment uses the horizontal transfer path 32 in the four-phase drive mode to do the left directional transfer and the right directional transfer sequentially. So, as shown in FIG. 14, after the periods T3 and T4 for the signal charge transfer by the smear sweep out, the periods T5 and T6 for the signal charge transfer by the image pickup with left and right directional charge transfer, respectively, sequentially elapse, moving to the periods T7 and T8 for the signal charge transfer by the image pickup with bidirectional charge transfer. The periods T3, T4, T7, and T8 shown in FIG. 14 are equal to the period T2 shown in FIG. 13. The periods T5 and T6 shown in FIG. 14 are also equal to the period T1 shown in FIG. 12.

In this alternative embodiment, the apparatus 10 may also be adapted to determine the amplifier characteristics of the output circuit in the reverse order of imaging where the image pickup with left directional charge transfer is done after the image pickup with right directional charge transfer.

In the apparatus 10 of another alternative embodiment, the output circuit characteristics determiner 24 may be adapted to detect, as the amplifier characteristics 120 of the left and right output circuits 34 and 36, the difference in the basic level, such as noise or color, between the left image data and the right image data in the picked-up image, and calculate the difference correction value 120 for correcting the difference.

The output circuit characteristics determiner 24 may be adapted to compare, for example, the right component of the total optical black data with the right optical black data and calculate the difference therebetween, and use the difference to calculate the difference correction value 120. The output circuit characteristics determiner 24 may also calculate the difference correction value 120 that may do the offset correction of the basic level that may adjust one of the right component of the total optical black data and the right optical black data that is darker than the other to the one that is lighter, i.e., adjust one of the left and right output circuits 34 and 36 that has the lower basic level to the one that has the higher basic level one.

The signal processor 22 then uses the difference correction value 120 calculated by the output circuit characteristics determiner 24 to correct the left image data in the digital image signal 116 and the right image data in the digital image signal 118.

In the apparatus 10 of a further alternative embodiment, the output circuit characteristics determiner 24 may be adapted to detect, as the amplifier characteristics 120 of the left and right output circuits 34 and 36, the difference in the dark noise between the left and right image data of the picked-up image.

In that case, the image sensor 18 acquires the total optical black data, the left optical black data, and the right optical black data, which all have the dark noise of the left output circuit 34 and the right output circuit 36. The output circuit characteristics determiner 24 then compares the right component of the total optical black data with the right optical black data and calculates the difference in the dark noise therebetween. The determiner 24 then uses the difference to calculate the noise reduction parameter 120 of the left and right output circuits 34 and 36.

The signal processor 22 then uses the noise reduction parameter 120 calculated by the output circuit characteristics determiner 24 to correct the left image data in the digital image signal 116 and the right image data in the digital image signal 118.

The apparatus 10 of a still further alternative embodiment may be configured to determine the amplifier characteristics of the output circuit as follows. The image sensor 18 only acquires the optical black data. Based on the optical black data, the output circuit characteristics determiner 24 in the signal processor 22 determines the amplifier characteristics 120 of the left and right output circuits 34 and 36.

In this alternative embodiment, the system controller 14 generates, when the apparatus 10 determines the amplifier characteristics of the output circuit, the control signal 104 that also indicates the output circuit characteristics determination.

The timing generator 16 generates, in response to the control signal 104 indicating the output circuit characteristics determination, the timing signals 108 and 110 that also indicate the optical black data acquisition so that the image sensor 18 acquires the optical black data only from the pixels in the optical black area 38 in the imaging surface 30.

When receiving the timing signal 108 indicating the optical black data acquisition, e.g., in response to the timing signal 108 indicating the bidirectional transfer and the optical black data acquisition, the image sensor 18 acquires the left optical black data on the left side of the dividing line 40 in the optical black area 38 and the right optical black-data on the right side, and produces the analog electrical signal 112 indicating the left optical black data and the analog electrical signal 114 indicating the right optical black data.

In response to the timing signal 108 indicating the left directional transfer and the optical black data acquisition, the image sensor 18 acquires the total optical black data in the optical black area 38 via the left output circuit 34 and produces the analog electrical signal 112 indicating the left-transferred total optical black data. In response to the timing signal 108 indicating the right directional transfer and the optical black data acquisition, the image sensor 18 acquires the total optical black data in the optical black area 38 via the right output circuit 36 and produces the analog electrical signal 114 indicating the right-transferred total optical black data.

The output circuit characteristics determiner 24 then acquires only optical black data from the digital image signals 116 and 118. The determiner 24 then uses the optical black data to determine the amplifier characteristics 120 of the left and right output circuits 34 and 36.

Figure 15:
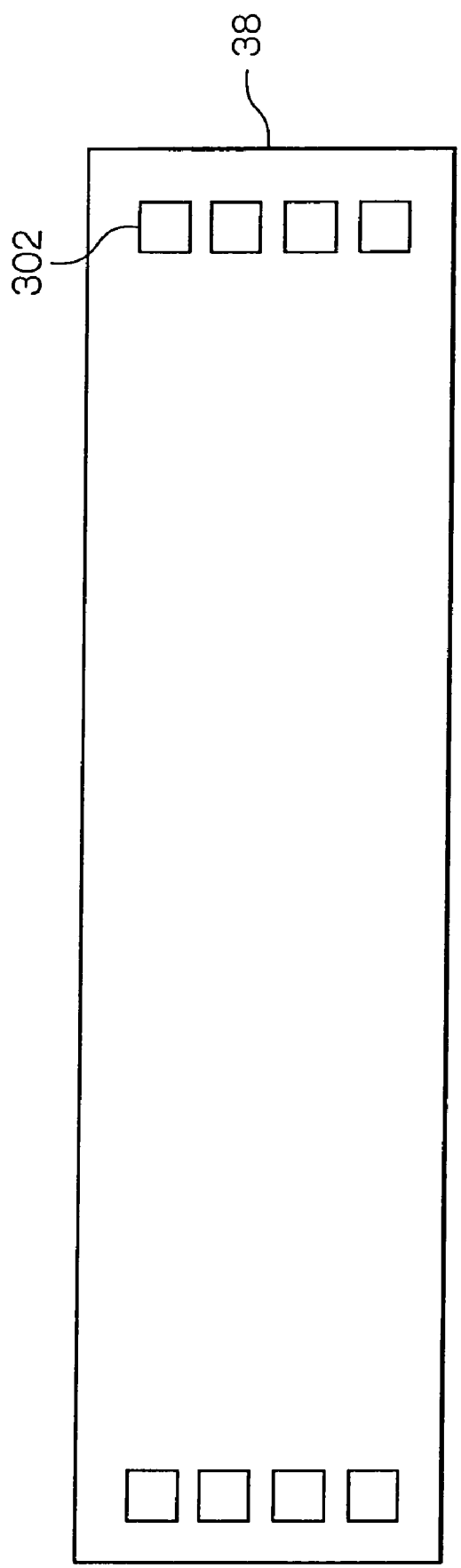
FIGS. 15 and 16 schematically illustrate an optical black area in the solid-state image pickup apparatus of other alternative embodiments of the present invention.

In another alternative embodiment, the solid-state image pickup apparatus 10 may be structured for determining the amplifier characteristics of the output circuit to read below. The apparatus 10 includes, in a portion in the optical black area 38 as shown in FIG. 15, a charge-generating pixel 302 that is designed to generate small or minute signal charge. The apparatus 10 thus acquires, as signal charge indicating the incident light amount, generated data from the optical black area 38. The output circuit characteristics determiner 24 then compares the generated data and determines the amplifier characteristics of the left and right output circuits 34 and 36.

The optical black area 38 in this embodiment may include the charge-generating pixels 302 having the same sensitivity on the right and left sides of the dividing line 40 at positions axisymmetric about the dividing line 40. The charge-generating pixel 302 having low sensitivity may be provided for small signal charge.

The image sensor 18 may thus acquire the optical black data including the generated data from the optical black area 38. By the image pickup with bidirectional charge transfer, for example, the image sensor 18 may acquire the left generated data on the left side of the dividing line 40 in the optical black area 38 and the right generated data on the right side, and acquire the left optical black data including the left generated data and the right optical black data including the right generated data.

By the image pickup with left directional charge transfer, the image sensor 18 may acquire the left-transferred total generated data from all charge-generating pixels in the optical black area 38, and acquire the left-transferred total optical black data including the left-transferred total generated data. By the image pickup with right directional charge transfer, the image sensor 18 may acquire the right-transferred total generated data from all charge-generating pixels in the optical black area 38, and acquire the right-transferred total optical black data including the right-transferred total generated data.

The output circuit characteristics determiner 24 may compare the optical black data by comparing the generated data, and detect, as the amplifier characteristics of the left and right output circuits 34 and 36, the difference in the charge detection sensitivity. Based on the difference, the determiner 24 may acquire information for use in the image processing parameter or in the camera sensitivity setting.

Figure 16:
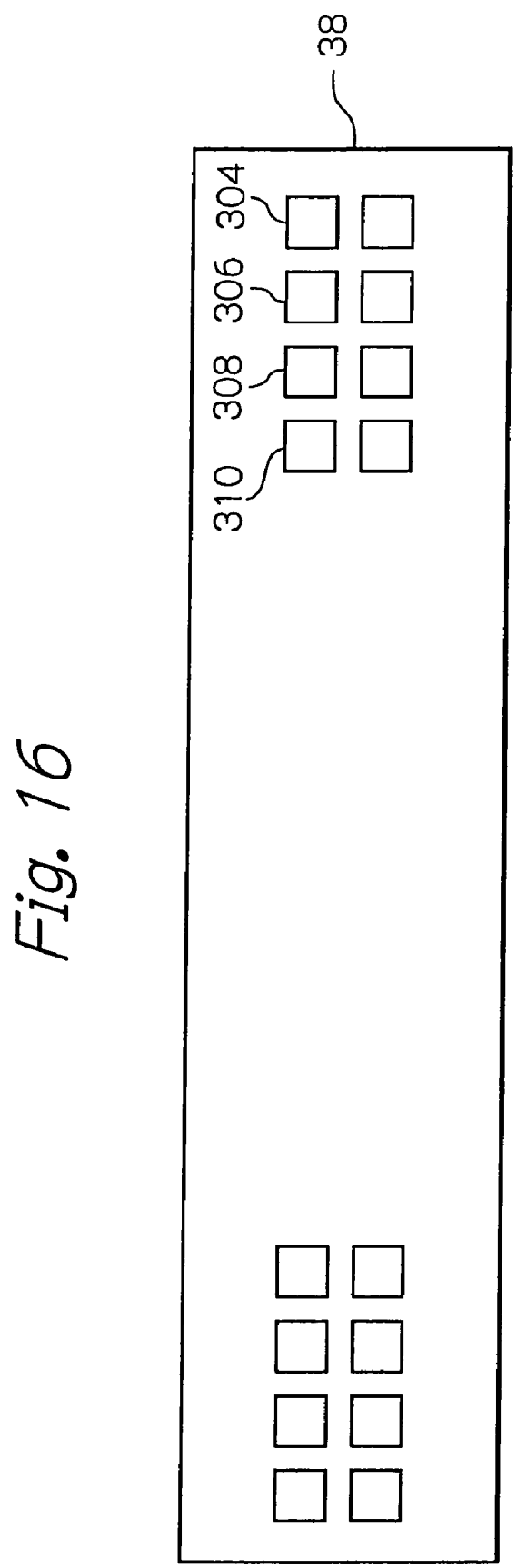

The optical black area 38 may also include, as shown in FIG. 16, a plurality of charge-generating pixels 304, 306, 308, and 310 having sensitivities different from each other, which may provide signal charge indicating various charge levels. The farther from the dividing line 40 toward the left end or the right end, the higher sensitivity the charge-generating pixels 304, 306, 308, and 310 have, thus providing more charge.

The bidirectional transfer, for example, in the image sensor 18 including the optical black area 38 may provide, as shown in FIG. 17, the left optical black data 402 and the right optical black data 404, respectively. The right optical black data 404 shows that the right output circuit 36 provides outputs proportional to the charge, i.e., the right output circuit 36 has a high linearity. The left optical black data 402 shows that the left output circuit 34 has a low linearity.

The output circuit characteristics determiner 24 may use the left and right optical black data 402 and 404 including various levels of generated data to detect, as the amplifier characteristics of the left and right output circuits 34 and 36, the difference in linearity between the circuits. The determiner 24 may then use the difference to equalize the basic levels, increase the linearity, and calculate the linearity correction value that corrects the digital image signals 116 and 118.

The entire disclosure of Japanese patent application No. 2006-058015 filed on Mar. 3, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A solid-state image pickup apparatus comprising:
   an image sensor having an imaging surface comprising a plurality of pixels for producing signal charge for photoelectric conversion to produce image data from the signal charge, the plurality of pixels comprising photosensitive cells arranged in a row and a column direction; and a signal processor for receiving the image data from said image sensor and processing the image data, said image sensor having an optical black area for providing black-level signal charge, said image sensor comprising a plurality of output circuits respectively corresponding to a plurality of sub-areas forming a frame of image, and a horizontal transfer path for horizontally transferring the signal charge from the pixels to one of said output circuits, said output circuits using the signal charge transferred from said horizontal transfer path to output the image data;

said apparatus further comprising a controller for directing determination of amplifier characteristics of said output circuits or directing normal imaging, said image sensor being in response to the direction of the amplifier characteristics determination to transfer first signal charge to first one of said output circuits, by allowing said imaging surface to send the first signal charge acquired from all pixels to said horizontal transfer path, allowing said horizontal transfer path to horizontally transfer the first signal charge to said first output circuit, and allowing said first output circuit to use the first signal charge to output first image data, while said imaging surface sends the first signal charge comprising optical black signal charge from the optical black area to said horizontal transfer path, and said first output circuit outputs the first image data comprising first optical black data indicating the optical black signal charge, said signal processor comprising a characteristics determiner operative in response to the direction of the amplifier characteristics determination for using at least the first optical black data in the first image data to determine a plurality of amplifier characteristics of said output circuits, said image sensor being operative in response to the direction of the normal imaging to transfer second signal charge to each of said output circuits, by allowing said imaging surface to send the second signal charge from the pixels in each of the sub-areas to said horizontal transfer path, allowing said horizontal transfer path to horizontally transfer the second signal charge from each sub-area to said corresponding output circuit, and allowing said output circuits to use the second signal charge to output a plurality of sets of second image data, said signal processor being operative in response to the direction of the normal imaging to process the sets of second image data to correct the second image data based on the amplifier characteristics, and produce third image data indicating one whole image comprising the sets of second image data.

2. The apparatus in accordance with claim 1, wherein said image sensor transfers, in response to the direction of the amplifier characteristics determination, the first signal charge by allowing said imaging surface to send the optical black signal charge only from the pixels in the optical black area to the horizontal transfer path as the first signal charge.

3. The apparatus in accordance with claim 1, wherein said output circuits comprises a left output circuit for receiving signal charge transferred horizontally in the left direction from said horizontal transfer path, and a right output circuit for receiving signal charge transferred horizontally in the right direction from said horizontal transfer path, said characteristics determiner being operative in response to the direction of the amplifier characteristics determination to determine the amplifier characteristics of said left output circuit and right output circuit as the amplifier characteristics, said image sensor being operative in response to the direction of the normal imaging to transfer the second signal charge by dividing one image into a left image and a right image as the sub-areas, by allowing said horizontal transfer path to horizontally transfer left signal charge from the left image in the left direction to said left output circuit and horizontally transfer right signal charge from the right image in the right direction to said right output circuit, allowing said left output circuit to use the left signal charge to output left image data, and allowing said right output circuit to use the right signal charge to output right image data, said signal processor being operative in response to the direction of the normal imaging to process the left image data and right image data, to correct the left and right image data based on the amplifier characteristics of said left output circuit and right output circuit, respectively, and to produce third image data indicating one whole image comprising the left image data and right image data.

4. The apparatus in accordance with claim 3, wherein said image sensor transfers, in response to the direction of the amplifier characteristics determination, the first signal charge by using said left output circuit as said first output circuit and allowing said left output circuit to use the first signal charge to output the first image data.

5. The apparatus in accordance with claim 3, wherein said image sensor transfers, in response to the direction of the amplifier characteristics determination, the first signal charge by using said right output circuit as said first output circuit and allowing said right output circuit to use the first signal charge to output the first image data.

6. The apparatus in accordance with claim 3, wherein said image sensor transfers, in response to the direction of the amplifier characteristics determination, the first signal charge as well as transfers fourth signal charge to each of said output circuits by allowing said imaging surface to send the fourth signal charge from the pixels in each sub-area to said horizontal transfer path, allowing said horizontal transfer path to horizontally transfer the fourth signal charge from each sub-area to said corresponding output circuit, and allowing said output circuits to use the fourth signal charge to output a plurality sets of fourth image data, while said imaging surface sends the fourth signal charge comprising optical black signal charge from the optical black area to said horizontal transfer path, and said output circuits outputs the fourth image data comprising fourth optical black data indicating the optical black signal charge, said characteristics determiner being operative in response to the direction of the amplifier characteristics determination to use the first optical black data in the first image data and the fourth optical black data in the fourth image data to determine the amplifier characteristics.

7. The apparatus in accordance with claim 6, wherein said image surface transfers, in response to the direction of the amplifier characteristics determination, the fourth signal charge by allowing said imaging surface to send the optical black signal charge only from the pixels in the optical black area to said horizontal transfer path as the fourth signal charge.

8. The apparatus in accordance with claim 6, wherein said image sensor transfers, in response to the direction of the amplifier characteristics determination, the fourth signal charge by dividing one image into a left image and a right image as the sub-areas, and by allowing said imaging surface to send the left signal charge from the left image and the right signal charge from the right image to said horizontal transfer path as the fourth signal charge, allowing said horizontal transfer path to horizontally transfer, among the fourth signal charge, the left signal charge in the left direction to the left output circuit and horizontally transfer the right signal charge in the right direction to the right output circuit, and allowing the left and right output circuits to use the left and right signal charge to output the left and right image data as the fourth image data, respectively, while said imaging surface sends the fourth signal charge comprising the left optical black signal charge from the optical black area in the left image and the right optical black signal charge from the optical black area in the right image to said horizontal transfer path, and said output circuits outputs the fourth image data comprising the fourth optical black data indicating the optical black signal charge by allowing the left and right output circuits to output the fourth image data comprising the left and right optical black data indicating the left and right optical black signal charge, respectively, said characteristics determiner being operative in response to the direction of the amplifier characteristics determination to use the first optical black data in the first image data and the left or right optical black data in the fourth image data to determine the amplifier characteristics.

9. The apparatus in accordance with claim 6, wherein said image sensor transfers, in response to the direction of the amplifier characteristics determination, the fourth signal charge by using the left output circuit as the fourth output circuit and allowing the left output circuit to use the fourth signal charge to output the fourth image data.

10. The apparatus in accordance with claim 6, wherein said image sensor transfers, in response to the direction of the amplifier characteristics determination, the fourth signal charge by using the right output circuit as the fourth output circuit and allowing the right output circuit to use the fourth signal charge to output the fourth image data.

11. The apparatus in accordance with claim 1, wherein said characteristics determiner detects, in response to the direction of the amplifier characteristics determination, a difference in a basic level between the sets of second image data as the amplifier characteristics and uses the difference to calculate the difference correction value, said signal processor being operative in response to the direction of the normal imaging to correct the sets of second image data using the difference correction value.

12. The apparatus in accordance with claim 1, wherein said characteristics determiner detects, in response to the direction of the amplifier characteristics determination, a difference in dark noise between said output circuits as the amplifier characteristics and uses the difference to calculate the noise reduction parameter, said signal processor being operative in response to the direction of the normal imaging to correct the sets of second image data using the parameter.

13. The apparatus in accordance with claim 1, wherein said image sensor comprises a charge-generating pixel in the optical black area for producing small signal charge, said charge-generating pixel being operative in response to the direction of the amplifier characteristics determination to use the signal charge from the charge-generating pixel to acquire the first image data comprising fifth produced data, said characteristics determiner being operative in response to the direction of the amplifier characteristics determination to use at least the fifth produced data in the first image data to detect a difference in a charge detection sensitivity as the amplifier characteristics, and to use the difference to acquire an image processing parameter or information for use in a camera sensitivity setting.

14. The apparatus in accordance with claim 1, wherein said image sensor comprises a plurality of charge-generating pixels having different sensitivities in the optical black area, said plurality of charge-generating pixels being operative in response to the direction of the amplifier characteristics determination to use the signal charge from said charge-generating pixels to acquire the first image data comprising six produced data, said characteristics determiner using, in response to the direction of the amplifier characteristics determination, at least the sixth produced data in the first image data to detect a difference in a linearity between said output circuits as the amplifier characteristics, and using the difference to calculate a linearity correction value.

15. A method of controlling a solid-state image pickup apparatus comprising:

an imaging step of receiving signal charge from a plurality of pixels forming an imaging surface to produce image data from the signal charge, the pixels comprising photosensitive cells for photoelectric conversion and being arranged in a row and a column direction, and a signal processing step of receiving the image data from said imaging step and processing the image data;

said imaging step using a plurality of output circuits respectively corresponding to a plurality of sub-areas forming the imaging surface and a horizontal transfer path for horizontally transferring the signal charge from the pixels to one of the output circuits, and outputting the image data from the outputs circuits based on the signal charge transferred from the horizontal transfer path;

said method further comprising a control step of directing determination of amplifier characteristics of the output circuits or directing normal imaging, said imaging step transferring, in response to the direction of the amplifier characteristics determination, first signal charge to a first output circuit of the output circuits, by allowing the imaging surface to send the first signal charge acquired from all pixels to the horizontal transfer path, allowing the horizontal transfer path to horizontally transfer the first signal charge to the first output circuit, and allowing the first output circuit to use the first signal charge to output first image data, while receiving optical black signal charge from an optical black area in the imaging surface for producing black-level signal charge, and sending the first signal charge comprising the optical black signal charge to the horizontal transfer path, and outputting, from the first output circuit, the first image data comprising first optical black data indicating the optical black signal charge, said signal processing step comprising a characteristics determination step of using, in response to the direction of the amplifier characteristics determination, at least the first optical black data in the first image data to determine a plurality of amplifier characteristics of the output circuits, said imaging step transferring, in response to the direction of the normal imaging, second signal charge to each of the output circuits, by allowing the imaging surface to send the second signal charge from the pixels in each sub-area to the horizontal transfer path, allowing the horizontal transfer path to horizontally transfer the second signal charge from each sub-area to the corresponding output circuit and allowing the output circuits to use the second signal charge to output a plurality sets of second image data, said signal processing step processing, in response to the direction of the normal imaging, the sets of second image data, correcting the second image data based on the amplifier characteristics, and producing third image data indicating one whole image comprising the second image data.

16. The method in accordance with claim 15, wherein said imaging step comprises transferring, in response to the direction of the amplifier characteristics determination, the first signal charge by allowing the imaging surface to send the optical black signal charge only from the pixels in the optical black area to the horizontal transfer path as the first signal charge.

17. The method in accordance with claim 15, wherein said imaging step comprises using, as the output circuits, a left output circuit for receiving signal charge transferred horizontally in the left direction from the horizontal transfer path and a right output circuit for receiving signal charge transferred horizontally in the right direction from the horizontal transfer path, said characteristics determination step comprising determining, in response to the direction of the amplifier characteristics determination, the amplifier characteristics of the left output circuit and right output circuit as the amplifier characteristics, said imaging step comprising transferring, in response to the direction of the normal imaging, the second signal charge by dividing one image into a left image and a right image as the sub-areas, and by allowing the horizontal transfer path to horizontally transfer left signal charge from the left image in the left direction to the left output circuit and horizontally transfer right signal charge from the right image in the right direction to the right output circuit, allowing the left output circuit to use the left signal charge to output left image data, and allowing the right output circuit to use the right signal charge to output right image data, and said signal processing step comprising processing the left image data and right image data in response to the direction of the normal imaging, correcting the left and right image data based on the amplifier characteristics of the left output circuit and right output circuit, respectively, and producing third image data indicating one whole image comprising the left image data and right image data.

18. The method in accordance with claim 17, wherein said imaging step comprises transferring, in response to the direction of the amplifier characteristics determination, the first signal charge by using the left output circuit as the first output circuit and by allowing the left output circuit to use the first signal charge to output the first image data.

19. The method in accordance with claim 17, wherein said imaging step comprises transferring, in response to the direction of the amplifier characteristics determination, the first signal charge by using the right output circuit as the first output circuit and by allowing the right output circuit to use the first signal charge to output the first image data.

20. The method in accordance with claim 17, wherein said imaging step comprises transferring, in response to the direction of the amplifier characteristics determination, the first signal charge as well as transfers fourth signal charge to each of the output circuits by allowing the imaging surface to send the fourth signal charge from the pixels in each sub-area to the horizontal transfer path, allowing the horizontal transfer path to horizontally transfer the fourth signal charge from each sub-area to the corresponding output circuit, and allowing the output circuits to use the fourth signal charge to output a plurality of sets of fourth image data, while allowing the imaging surface to send the fourth signal charge comprising optical black signal charge from the optical black area to the horizontal transfer path, and allowing the output circuits to output the fourth image data comprising fourth optical black data indicating the optical black signal charge, said characteristics determination step comprising using, in response to the direction of the amplifier characteristics determination, the first optical black data in the first image data and the fourth optical black data in the fourth image data to determine the amplifier characteristics.

21. The method in accordance with claim 20, wherein said imaging step comprises transferring, in response to the direction of the amplifier characteristics determination, the fourth signal charge by allowing the imaging surface to send the optical black signal charge only from the pixels in the optical black area to the horizontal transfer path as the fourth signal charge.

22. The method in accordance with claim 20, wherein said imaging step comprises transferring, in response to the direction of the amplifier characteristics determination, the fourth signal charge by dividing one image into a left image and a right image as the sub-areas, and by allowing the imaging surface to send the left signal charge from the left image and the right signal charge from the right image to the horizontal transfer path as the fourth signal charge, allowing the horizontal transfer path to horizontally transfer, among the fourth signal charge, the left signal charge in the left direction to the left output circuit and horizontally transfer the right signal charge in the right direction to the right output circuit, and allowing the left and right output circuits to use the left and right signal charge to output the left and right image data as the fourth image data, respectively, while allowing the imaging surface to send the fourth signal charge comprising the left optical black signal charge from the optical black area in the left image and the right optical black signal charge from the optical black area in the right image to the horizontal transfer path, and allowing the output circuits to output the fourth image data comprising the fourth optical black data indicating the optical black signal charge by allowing the left and right output circuits to output the fourth image data comprising the left and right optical black data indicating the left and right optical black signal charge, respectively, said characteristics determination step comprising using, in response to the direction of the amplifier characteristics determination, the first optical black data in the first image data and the left or right optical black data in the fourth image data to determine the amplifier characteristics.

23. The method in accordance with claim 20, wherein said imaging step comprises transferring, in response to the direction of the amplifier characteristics determination, the fourth signal charge by using the left output circuit as the fourth output circuit and by allowing the left output circuit to use the fourth signal charge to output the fourth image data.

24. The method in accordance with claim 20, wherein said imaging step comprises transferring, in response to the direction of the amplifier characteristics determination, the fourth signal charge by using the right output circuit as the fourth output circuit and by allowing the right output circuit to use the fourth signal charge to output the fourth image data.

25. The method in accordance with claim 15, wherein said characteristics determination step comprises detecting, in response to the direction of the amplifier characteristics determination, a difference in a basic level between the sets of second image data as the amplifier characteristics and using the difference to calculate the difference correction value, said signal processing step comprising correcting, in response to the direction of the normal imaging, the sets of second image data using the difference correction value.

26. The method in accordance with claim 1, wherein said characteristics determination step detects, in response to the direction of the amplifier characteristics determination, a difference in dark noise between the output circuits as the amplifier characteristics and uses the difference to calculate the noise reduction parameter, said signal processing step correcting, in response to the direction of the normal imaging, the sets of second image data using the parameter.

27. The method in accordance with claim 15, wherein said imaging step comprises providing a charge-generating pixel in the optical black area that provides small signal charge, and using, in response to the direction of the amplifier characteristics determination, the signal charge from the charge-generating pixel to acquire the first image data comprising fifth produced data, said characteristics determination step comprising using, in response to the direction of the amplifier characteristics determination, at least the fifth produced data in the first image data to detect a difference in a charge detection sensitivity as the amplifier characteristics, and using the difference to acquire an image processing parameter or information for use in a camera sensitivity setting.

28. The method in accordance with claim 15, wherein said imaging step comprises providing a plurality of charge-generating pixels having different sensitivities in the optical black area, and using, in response to the direction of the amplifier characteristics determination, the signal charge from the charge-generating pixels to acquire the first image data comprising six produced data, said characteristics determination step comprising using, in response to the direction of the amplifier characteristics determination, at least the sixth produced data in the first image data to detect a difference in a linearity between the output circuits as the amplifier characteristics, and using the difference to calculate a linearity correction value.

* * * * *